(12) United States Patent
In et al.

(10) Patent No.: US 10,365,690 B2
(45) Date of Patent: Jul. 30, 2019

(54) FLEXIBLE DISPLAY DEVICE AND METHOD FOR COMPENSATING IMAGE OF FLEXIBLE DISPLAY DEVICE

(71) Applicant: Samsung Display Co., Ltd, Yongin-si, Gyeonggi-do (KR)

(72) Inventors: Hai-Jung In, Seoul (KR); Bo-Yong Chung, Suwon-si (KR)

(73) Assignee: Samsung Display Co., Ltd. (KR)

( * ) Notice: Subject to any disclaimer, the term of this patent is extended or adjusted under 35 U.S.C. 154(b) by 90 days.

(21) Appl. No.: 15/382,068

(22) Filed: Dec. 16, 2016

(65) Prior Publication Data

US 2017/0309226 A1 Oct. 26, 2017

(30) Foreign Application Priority Data

Apr. 26, 2016 (KR) .................. 10-2016-0050589

(51) Int. Cl.
 *G06F 1/16* (2006.01)
 *G09G 3/20* (2006.01)
(52) U.S. Cl.
 CPC .............. *G06F 1/1652* (2013.01); *G09G 3/20* (2013.01); *G09G 2320/029* (2013.01); *G09G 2320/0233* (2013.01); *G09G 2320/0295* (2013.01); *G09G 2330/12* (2013.01); *G09G 2360/145* (2013.01); *G09G 2360/16* (2013.01); *G09G 2380/02* (2013.01)
(58) Field of Classification Search
 CPC .............. G06F 1/1652; G09G 2380/02; G09G 2320/0233; G09G 2320/029; G09G 2320/045; G09G 2360/14–148
 See application file for complete search history.

(56) References Cited

U.S. PATENT DOCUMENTS

| | | | | |
|---|---|---|---|---|
| 8,096,068 | B2* | 1/2012 | Van Rens | G09F 9/35 40/514 |
| 9,230,468 | B2* | 1/2016 | Kwack | G06F 1/1652 |
| 9,245,477 | B2* | 1/2016 | Kwack | G09G 3/3225 |
| 9,756,320 | B2* | 9/2017 | Ekambaram | G06F 1/1652 |
| 10,051,188 | B2* | 8/2018 | Nagano | G09G 3/002 |
| 2014/0002430 | A1* | 1/2014 | Kwack | G09G 3/3225 345/207 |
| 2015/0316962 | A1* | 11/2015 | Howes | G03B 21/58 16/87.2 |

(Continued)

FOREIGN PATENT DOCUMENTS

| KR | 10-2009-0069339 A | 6/2009 |
|---|---|---|
| KR | 10-2014-0101611 A | 8/2014 |
| KR | 10-2015-0089994 A | 8/2015 |

(Continued)

*Primary Examiner* — Gene W Lee
(74) *Attorney, Agent, or Firm* — Innovation Counsel LLP

(57) ABSTRACT

A flexible display device according to example embodiments includes a rollable display panel, a housing accommodating the rollable display panel in a rolled state and including an opening portion through which the rollable display panel is pulled out, an optical sensor disposed at the opening portion and configured to detect luminance of the rollable display panel while the rollable display panel is rolled or unrolled, a controller configured to compensate image data based on detection data generated by the optical sensor, and a display panel driver configured to control a display of rollable display panel.

13 Claims, 10 Drawing Sheets

(56) References Cited

U.S. PATENT DOCUMENTS

2016/0307545 A1* 10/2016 Lee .................... G09G 5/38
2017/0140737 A1* 5/2017 Cho .................. G06F 1/1652

FOREIGN PATENT DOCUMENTS

| KR | 10-2015-0092388 A | 8/2015 |
| KR | 10-2015-0095075 A | 8/2015 |
| KR | 10-2015-0110848 A | 10/2015 |

* cited by examiner

FLEXIBLE DISPLAY DEVICE AND METHOD FOR COMPENSATING IMAGE OF FLEXIBLE DISPLAY DEVICE

CROSS REFERENCE TO RELATED APPLICATION

This application claims priority to and the benefit of Korean Patent Application No. 10-2016-0050589, filed on Apr. 26, 2016 in the Korean Intellectual Property Office (KIPO), the disclosure of which is hereby incorporated by reference herein in its entirety.

BACKGROUND

1. Field

Example embodiments of the inventive concept relate to electronic devices. More particularly, example embodiments of the inventive concept relate to flexible display devices outputting, and methods for compensating image of the flexible display device.

2. Discussion of Related Art

An organic light emitting display device displays images using organic light emitting diodes. The organic light emitting display device is used in a flexible display device including such as a rollable display panel, a foldable display panel, etc. Because degradation of the organic light emitting diodes and differences in the threshold voltage/mobility of driving transistors may occur, luminance variations and image blur may be noticeable by a user. Thus, image data compensations are performed to improve display quality.

For example, there is an internal compensating method such that each pixel has a certain compensating circuit to compensate and an external compensating method such that electrical characteristics of the driving transistors and/or the organic light emitting diodes are detected by an external compensating circuit. However, the internal compensating method results in complicated pixel circuits. The external compensating method reduces the accuracy of the compensation and needs high reproducibility to improve the accuracy of the compensation.

SUMMARY

Example embodiments provide a flexible display device detecting luminance of a rollable display panel to compensate image data while the rollable display panel is rolled or unrolled.

Example embodiments provide a method for compensating image of the flexible display device.

According to example embodiments, a flexible display device may comprise a rollable display panel, a housing accommodating the rollable display panel in a rolled state and including an opening portion through which the rollable display panel is pulled out, an optical sensor disposed at the opening portion and configured to detect a luminance of the rollable display panel while the rollable display panel is rolled or unrolled, a controller configured to compensate image data based on detection data generated by the optical sensor, and a display panel driver configured to control a display of the rollable display panel.

In example embodiments, the luminance of the rollable display panel is a luminance of a plurality of pixels located in a detection region facing the optical sensor while the rollable display panel is rolled into or unrolled out from the housing, and the optical sensor may detect the luminance of the plurality of pixels.

In example embodiments, the controller may control the display panel driver such that the pixels of the plurality of pixels located in the detection region emits light in synchronization with a rolling speed of the rollable display panel.

In example embodiments, the controller may control the display panel driver so that the pixels located in the detection region emit light in synchronization with an unrolling speed of the rollable display panel.

In example embodiments, the flexible display device may further comprise a memory configured to store the detection data including luminance information of the pixels detected by the optical sensor, a rotator on which the rollable display panel is rolled, and a motor coupled to the rotator and configured to rotate the rotator to control the rolled state of the rollable display panel.

In example embodiments, the controller may comprise a compensation value calculator configured to calculate a compensation value based on the detection data stored in the memory, and a compensator configured to compensate the image data based on the compensation value.

In example embodiments, the compensation value calculator may relatively compare the detection data of all of the pixels so as to calculate the compensation value for compensating luminance variations and degradation.

In example embodiments, the compensation value calculator may compare a predetermined reference luminance and the detection data so as to calculate the compensation value for compensating luminance variations and degradation.

In example embodiments, the controller may further comprise a test pattern controller configured to control the display panel driver such that the pixels located in the detection region display a predetermined test pattern, and a rotation controller configured to control a rotation speed of the motor such that the test pattern is located in the detection region.

In example embodiments, a moving speed of the test pattern moving on the rollable display panel may be substantially the same as at least one of a rolling speed and an unrolling speed of the rollable display panel.

In example embodiments, the pixels may stop emitting light when the pixels get out of the detection region.

In example embodiments, the optical sensor may be facing a light emitting surface of the rollable display panel.

In example embodiments, the optical sensor may correspond to at least one line optical sensor.

In example embodiments, the pixels facing the at least one line optical sensor may correspond to at least one pixel line.

In example embodiments, the rolled state of the rollable display panel may be a zigzag form.

According to example embodiments, a method for compensating image of a flexible display device may comprise detecting luminance of a plurality of pixels located in a detection region and facing an optical sensor by using the optical sensor disposed at an opening portion of a housing while a rollable display panel is rolled into the housing or unrolled out from the housing, storing detection data generated by the optical sensor in a memory, compensating image data based on the detection data, and displaying an image based on compensated image data.

In example embodiments, detecting the luminance of the plurality of pixels may comprise displaying a predetermined test pattern by the pixels of the plurality of pixels in the detection region in synchronization with a rolling speed of the rollable display panel, generating the detection data including luminance information of the pixels with respect to the test pattern, and stopping a light emission of the pixels when the pixels get out of the detection region.

In example embodiments, detecting the luminance of the plurality of pixels may comprise displaying a predetermined test pattern by the pixels of the plurality of pixels in the detection region in synchronization with an unrolling speed of the rollable display panel, generating the detection data including luminance information of the pixels with respect to the test pattern, and stopping a light emission of the pixels when the pixels get out of the detection region.

In example embodiments, compensating the image data may comprise calculating a compensation value for compensating luminance variations and degradation by comparing the detection data of all of the pixels, and generating the compensated image data of a digital type based on the compensation value.

In example embodiments, a moving speed of the test pattern moving on the rollable display panel may be substantially the same as at least one of a rolling speed and an unrolling speed of the rollable display panel.

Therefore, the flexible display device according to example embodiments may include the optical sensor 300 detecting the luminance of each pixel P during the rolling and/or unrolling, and the controller 400 controlling the luminance detection and compensation, so that the compensation accuracy of the luminance variations, characteristic variations, and degradation of the pixels may be improved. In addition, the luminance detection and the compensation may be frequently performed during the rolling and/or unrolling, so that the flexible display device having high quality and high luminance uniformity may consistently provide to user in use.

The method for compensating the image of the flexible display device may directly detect the luminance of the pixels using the optical sensor during the rolling and/or unrolling so that the compensation accuracy of the luminance variations, characteristic variations, and degradation of the pixels may be improved.

BRIEF DESCRIPTION OF THE DRAWINGS

Example embodiments can be understood in more detail from the following description taken in conjunction with the accompanying drawings, in which.

DETAILED DESCRIPTION OF EMBODIMENTS

Exemplary embodiments will be described more fully hereinafter with reference to the accompanying drawings, in which various embodiments are shown.

Figure 1:
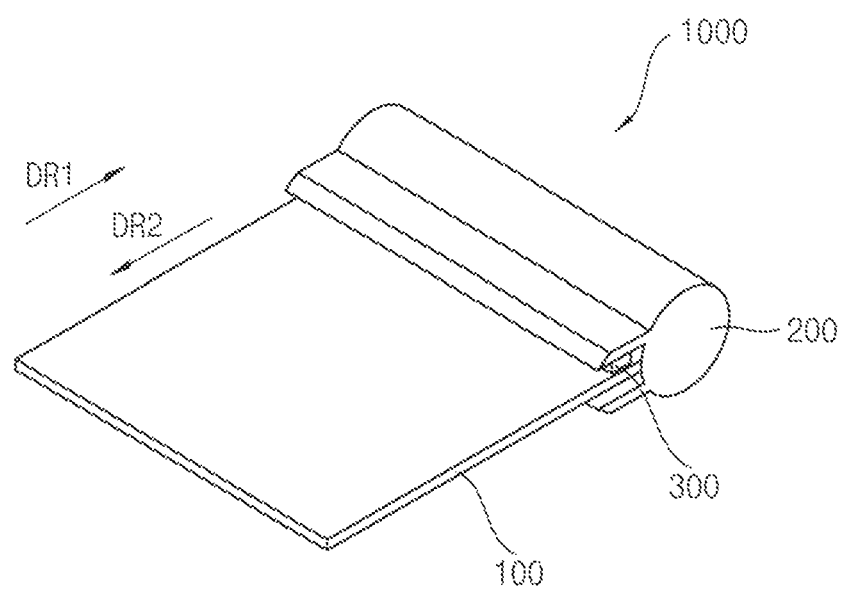
FIG. 1 is a diagram of a flexible display device according to example embodiments.
Figure 2:
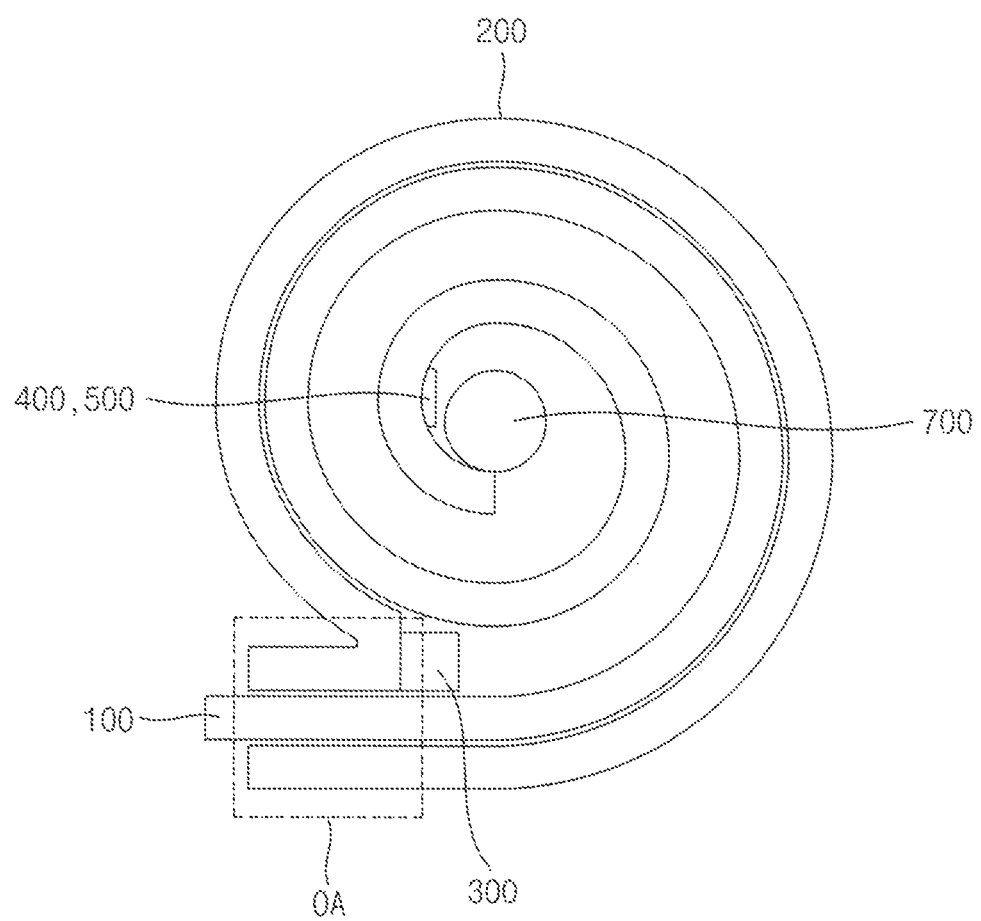
FIG. 2 is a cross-sectional view illustrating an example of a cross section of the flexible display device of FIG. 1.
Figure 3:
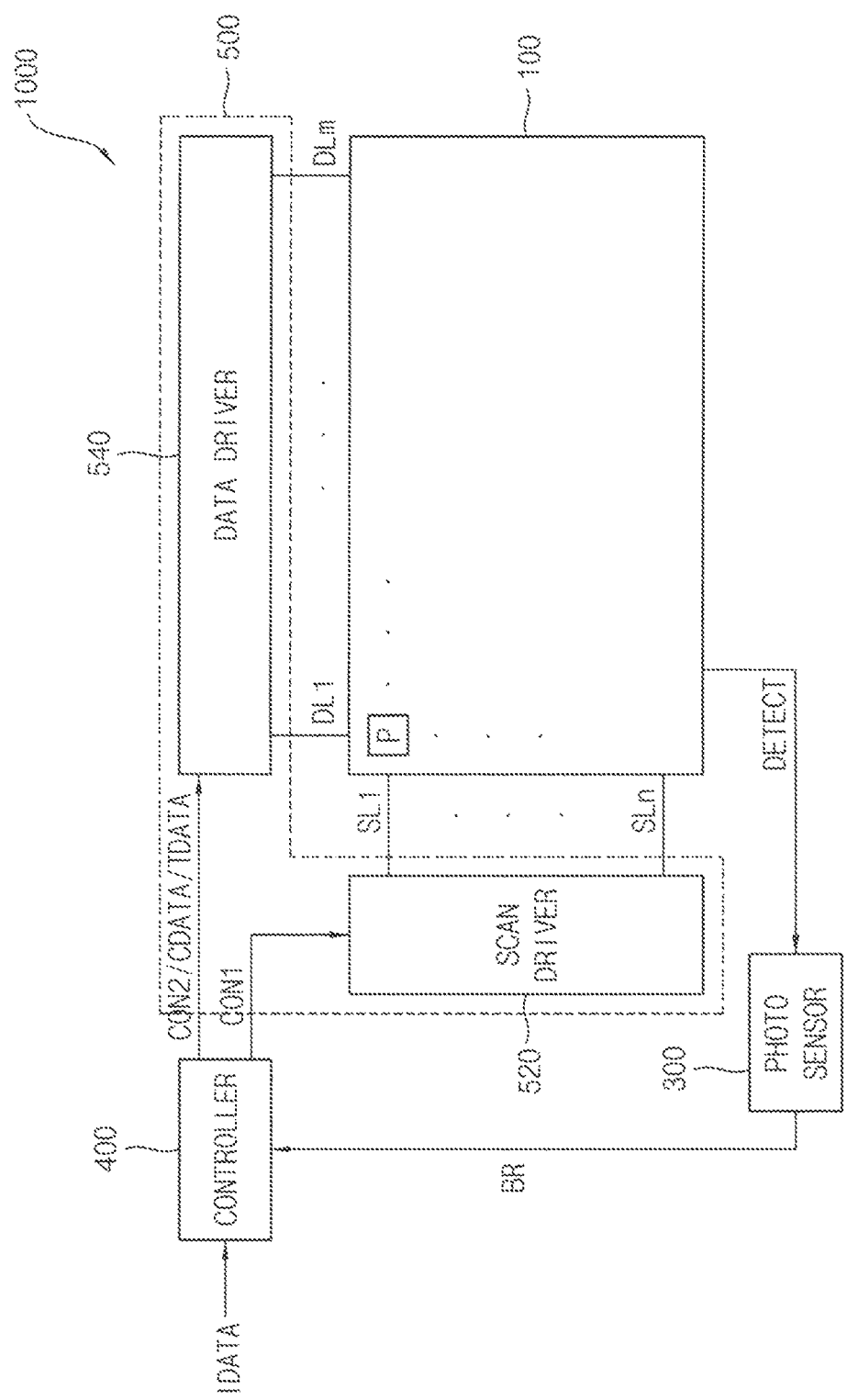
FIG. 3 is a block diagram illustrating an example of the flexible display device of FIG. 1.

FIG. 1 is a diagram of a flexible display device according to example embodiments. FIG. 2 is a cross-sectional view illustrating an example of a cross section of the flexible display device of FIG. 1. FIG. 3 is a block diagram illustrating an example of the flexible display device of FIG. 1.

Referring to FIGS. 1 to 3, the flexible display device 1000 may include a rollable display panel 100, a housing 200, an optical sensor 300, a controller 400, and a display panel driver 500. In one embodiment, the flexible display device may further include a memory configured to store detection data including luminance information and location information of the pixels detected by the optical sensor 300, a rotator 700 on which the rollable display panel 100 is rolled, and a motor coupled to the rotator 700 and configured to rotate the rotator to control rolling of the rollable display panel 100.

The rollable display panel 100 may include a flexible substrate and a plurality of pixels P on the flexible substrate. The rollable display panel 100 may be connected to the display panel driver 500 via a plurality of scan lines SL1 to SLn and via a plurality of data lines DL1 to DLm. The rollable display panel 100 may be connected to the data driving circuit 540 via a plurality of data lines DL1 to DLm. The pixels P may be respectively arranged at locations corresponding to crossing regions of the scan lines SL1 to SLn and the data lines DL1 to DLm.

In one embodiment, each of the pixels P may include an organic light emitting diode. The rollable display panel 100 may be rolled in a first direction DR1 and accommodated in the housing 200. The rollable display panel 100 may be pulled out (or unrolled) in a second direction DR2 opposite to the first direction DR1 to display an image.

In one embodiment, the rollable display panel 100 may be rolled on the rotator 700 and accommodated in the housing 200. In one embodiment, the rotator may be in a cylinder form. However, this is merely an example, and forms of the rotator 700 are not limited thereto.

The housing 200 may accommodate the rollable display panel 100. The housing may include at least one opening portion (e.g., indicated by opening portion OA in FIG. 2) through which the rollable display panel 100 is pulled out. The housing 200 may protect the rollable display panel 100 from an external environment. In one embodiment, the housing 200 may be a cylinder form. However, this is merely an example, and forms of the housing 200 are not limited thereto. For example, a cross section of the housing 200 may be a square form, a hexagonal form, etc.

The optical sensor 300 may be disposed at the opening portion OA of the housing 200. The optical sensor 300 may be facing a light emitting surface of the rollable display panel 100. The optical sensor 300 may detect luminance of the rollable display panel 100 while the rollable display panel 100 is rolled or unrolled. The optical sensor 300 may detect the luminance of the pixels located in a detection region facing the optical sensor 300. In one embodiment, the optical sensor 300 may detect luminance of the pixels passing through the detection region when the rollable display panel 100 is pulled out (or unrolled) to display image. In one embodiment, the optical sensor 300 may detect luminance of the pixels passing through the detection region when the rollable display panel 100 is rolled into the housing 200. The optical sensor 300 may be controlled by a control signal received from the controller 400. The optical sensor 300 may convert the detected luminance into an electrical signal (e.g., detection data BR) and provide the electrical signal to the controller 400.

Accordingly, the optical sensor 300 may directly detect luminance of each pixel P while the rollable display panel 100 is rolled into and/or unrolled out from the housing 200. Thus, the compensation accuracy of the luminance variations, characteristic variations, and degradation of the pixels may be improved.

In one embodiment, the optical sensor 300 may include at least one line optical sensor. The line optical sensor 300 may be substantially parallel to pixel lines (e.g., a pixel row line or a pixel column line) included in the rollable display panel 100.

The controller 400 may control the optical sensor 300 and the display panel driver 500. In one embodiment, the controller 400 may control the display panel driver 500 such that the pixels P in the detection region emit light in synchronization with a rolling speed of the rollable display panel 100. The pixels P may pass through the detection region when the rollable display panel 100 is rolled into the housing 200. Thus, when the rollable display panel 100 is rolled into the housing 200, only the pixels P in the detection region may emit light. Similarly, the controller 400 may control the display panel driver 500 such that the pixels P in the detection region emit light in synchronization with an unrolling speed of the rollable display panel 100. Thus, when the rollable display panel 100 is pulled out from the housing 200, pixels P in the detection region may be the only pixels P which may emit light. Alternatively, pixels P which have already passed through the detection region may emit light as well, in addition to the pixels P in the detection region.

The controller 400 may compensate the image data based on the detection data BR generated by the optical sensor 300. In one embodiment, the controller 400 may be mounted on the rollable display panel 100. In one embodiment, the controller 400 may be accommodated in the housing 200 and electrically connected to the rollable display panel 100.

In one embodiment, the controller 400 may control the optical sensor 300 to detect the luminance only while the rollable display panel 100 is being rolled and/or unrolled.

The controller 400 may calculate a compensation value and compensate the image data IDATA based on the compensation value. In one embodiment, the controller 400 may compare the detection data BR of all of the pixels P stored in the memory so as to calculate the compensation value for compensating the luminance variations and the degradation. In one embodiment, the controller 400 may compare a predetermined reference luminance and the detection data so as to calculate the compensation value for compensating the luminance variations and the degradation. The controller 400 may generate compensated image data CDATA of a digital type and provide the compensated image data CDATA to the display panel driver 500. In one embodiment, the controller 400 may include a timing controller to control a driving timing of the display panel 500. For example, the controller 400 may provide a first control signal CON1 for controlling a driving timing of a scan driver 520 to the scan driver 520, and provide a second signal CON2 for controlling a driving timing of a data driver 540 to the data driver 540. When the rollable display panel 100 displays an image, the controller 400 may provide the compensated image data CDATA to the data driver 540.

The controller 400 may provide test image data TDATA of a digital type to the data driver 540 when the rollable display panel 100 is rolled or unrolled. In one embodiment, the test image data TDATA may have information of a test pattern corresponding to a size of the detection region. For example, the test image data TDATA may be image data for a single pixel line when the detection region corresponds to the single pixel line. The test image data TDATA may be a data value or a voltage corresponding to a predetermined reference luminance. For example, the reference luminance may correspond to a full white grayscale.

The display driver 500 may control the driving of the rollable display panel 100. In one embodiment, the display panel driver 500 may be mounted on at least one side of the rollable display panel 100 or embedded in the rollable display panel 100. The display panel driver 500 may include the scan driver 520 and the data driver 540. The rollable display panel 100 may display the image based on the signals receiving from the display panel driver 500 (e.g., a scan signal and a data signal).

The scan driver 520 may provide scan signals to the rollable display panel 100 via the scan lines SL1 to SLn based on the first control signal CON1. The data driver 540 may provide data signals of an analog type to the rollable display panel 100 via the data lines DL1 to DLm based on the second control signal CON2, the compensated image data CDATA and the test image data TDATA. In one embodiment, the display panel driver 500 may further include the timing controller.

As described above, the flexible display device 1000 may include the optical sensor 300 detecting the luminance of each pixel P during the rolling and/or unrolling, and the controller 400 controlling the luminance detection and compensation, so that the compensation accuracy of the luminance variations, characteristic variations, and degradation of the pixels may be improved. In addition, the luminance detection and the compensation may be frequently performed during the rolling and/or unrolling in use, so that the flexible display device having high quality and high luminance uniformity may consistently be provided to the user during use.

Figure 4:
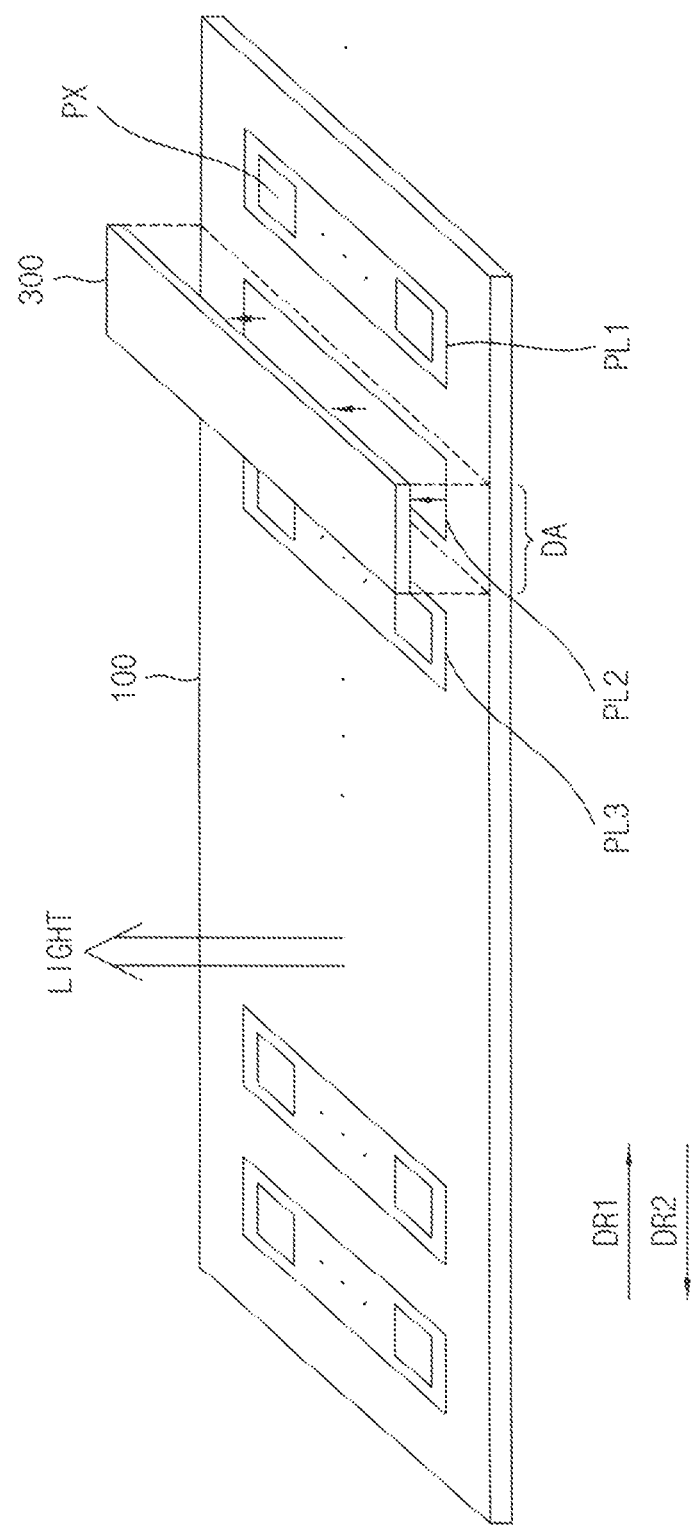
FIG. 4 is a diagram illustrating an example of an arrangement of an optical sensor included in the flexible display device of FIG. 1.

FIG. 4 is a diagram illustrating an example of an arrangement of an optical sensor included in the flexible display device of FIG. 1.

Referring to FIG. 4, the optical sensor 300 may be facing a light emitting surface of the rollable display panel 100.

In one embodiment, the optical sensor 300 may be disposed at an opening of a housing. The optical sensor 300 may detect luminance of the pixels PX in a detection region DA. The detection region DA may be facing to the optical sensor 300.

In one embodiment, the optical sensor 300 may comprise at least one line optical sensor. For example, as illustrated in FIG. 3, the detection region DA corresponding to a single line optical sensor may correspond to a single pixel line PL2.

A plurality of pixel lines PL1, PL2, PL3, . . . may move in a first direction DR1 when the rollable display panel 100 is rolled or rolled into the housing. The pixel lines PL1, PL2, PL3, . . . may move in a second direction DR2 when the rollable display panel 100 is unrolled or pulled out from the opening portion. When a certain pixel line, for example, PL2, is located in the detection region DA, the corresponding pixel line PL2 may emit light based on a predetermined test image data. Here, the optical sensor 300 may generate detection data including the detected luminance information of the corresponding pixel line PL2 and the location information of the pixels PX of the corresponding pixel line PL2 in the rollable display panel 100, and provide the detection data to a controller or a memory. In one embodiment, the pixels PX of the corresponding pixel line PL2 may stop emitting light when the pixels PX of the corresponding pixel line PL2 move out of the detection region DA.

In one embodiment, the optical sensor 300 may include a plurality of line optical sensors. Thus, the detection region may correspond to a region including a plurality of pixel lines so that the luminance detection may be performed on a plurality of pixel lines at a time.

Accordingly, the pixels (or the pixels lines) may sequentially emit light corresponding to the detection region DA when the rollable display panel 100 is rolled or unrolled, and the optical sensor 300 may directly detect the luminance of the pixels. Thus, detection (and compensation) of the luminance variations and characteristic variations of the pixels PX and degradation may be accurate in use.

Figure 5:
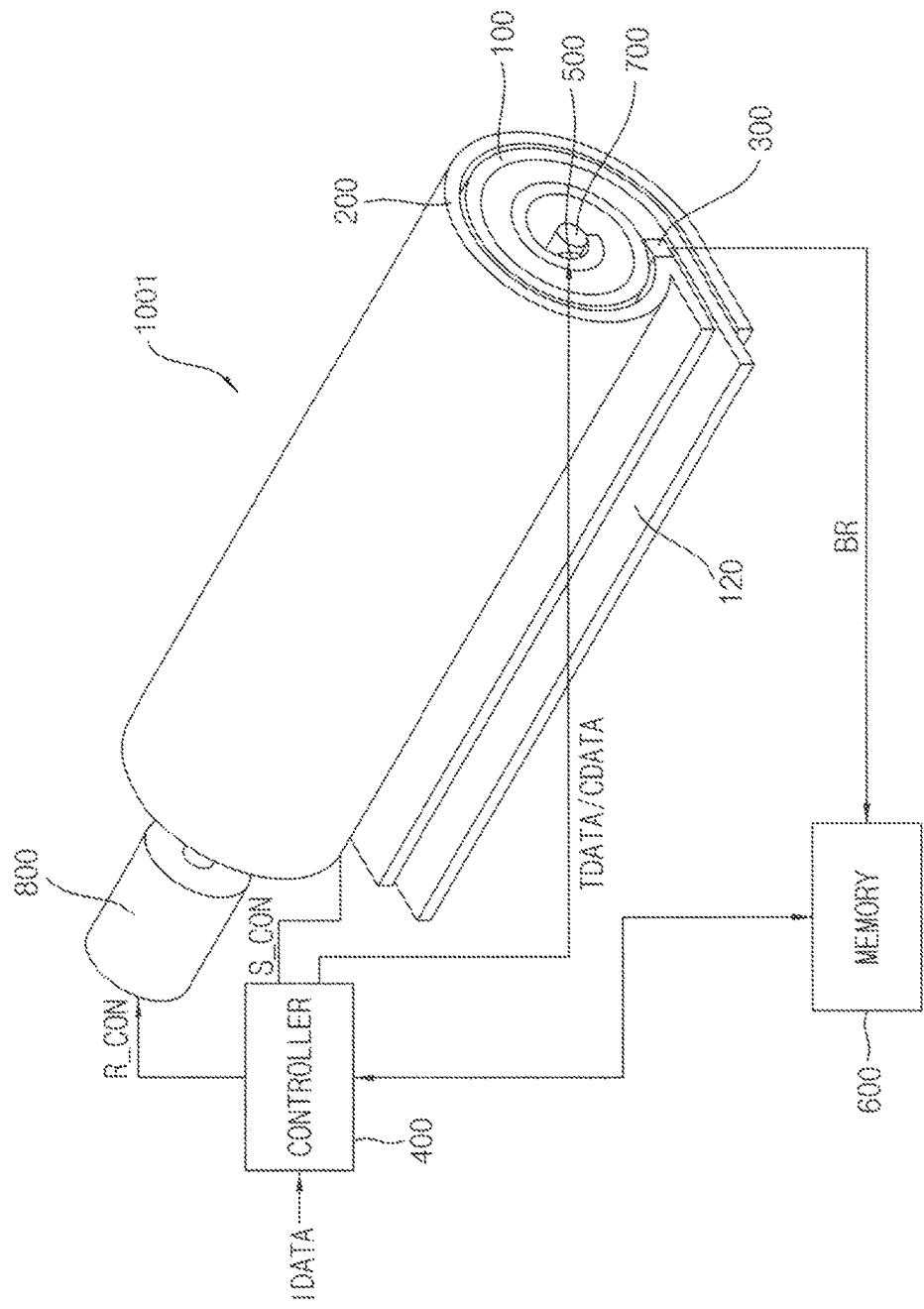
FIG. 5 is a diagram illustrating an example of the flexible display device of FIG. 1.

FIG. 5 is a diagram illustrating an example of the flexible display device of FIG. 1.

In FIG. 5, like reference numerals are used to designate elements of the flexible display device the same as those in FIGS. 1 to 3, and detailed description of these elements may be omitted. The flexible display device of FIG. 5 may be substantially the same as or similar to the flexible display device of FIGS. 1 to 3 except for the controller, a memory, and a motor.

Referring to FIG. 5, the flexible display device 1001 may include a rollable display panel 100, a housing 200, an optical sensor 300, a controller 400, a display panel driver 500, a memory 600, a rotator 700, and a motor 800.

The rollable display panel 100 may include a flexible substrate and a plurality of pixels on the flexible substrate. The rollable display panel 100 may be rolled in a first direction DR1 and accommodated in the housing 200. The rollable display panel 100 may be pulled out (or unrolled) in a second direction DR2 opposite to the first direction DR1 to display an image.

The housing 200 may accommodate the rollable display panel 100. The housing 200 may include at least one opening portion through which the rollable display panel 100 is pulled out.

The optical sensor 300 may be disposed at the opening portion of the housing 200. The optical sensor 300 may be facing a light emitting surface 120 of the rollable display panel 100 (e.g., a detection region). In one embodiment, the optical sensor 300 may include at least one line optical sensor. The line optical sensor 300 may be substantially parallel to pixel lines (e.g., a pixel row line or a pixel column line) included in the rollable display panel 100.

The optical sensor 300 may detect the luminance of corresponding pixels based on a detection control signal S_CON received from the controller 400 when the rollable display panel 100 is rolled or unrolled. The optical sensor 300 may convert the luminance into an electrical signal (e.g., detection data BR) and provide the detection data BR to the memory 600. In this case, the pixels may emit light based on a predetermined test image data TDATA. Thus, the pixels in the detection region may receive substantially the same data voltage (i.e., a test data voltage).

The display panel driver 500 may provide the test data voltage to the pixels corresponding to the detection region based on the test image data TDATA and test control signal T_CON received from the controller 400 while the rollable display panel 100 is rolled or unrolled. The test data voltage may correspond to a predetermined luminance level. In one embodiment, the display panel driver 500 may convert compensated image data CDATA received from the controller 400 into the data voltage of analog type and provide the data voltage to the rollable display panel 100. The rollable display panel 100 may display the image in which the degradation and luminance variations are compensated based on the data voltage.

The memory 600 may store the detection data BR received from the optical sensor 500. The detection data BR may include the location and luminance information of each corresponding pixel. The memory 600 may store the detection data BR of the all pixels and provide the detection data BR to the controller based on a command from the controller 600. The memory 600 may be a volatile memory or a non-volatile memory.

The motor 800 may be coupled to the rotator 700. The motor 800 may rotate the rotator 700 based on a rotation control signal R_CON received from the controller 400 such that a rolled state of the rollable display panel 100 may be controlled. The motor 800 may control a degree of rotation and a speed of rotation of the rotator 700 based on the rotation control signal R_CON.

The controller 400 may control the optical driver 300, the display panel driver 500, the memory 600 and the motor 800 based on the rolling or unrolling.

In one embodiment, the controller 400 may provide the detection control signal S_CON by detecting the rolling or unrolling.

In one embodiment, the controller 400 may provide the test control signal T_CON and the test image data TDATA to the display panel driver 500 such that the pixels corresponding to the detection region displays the predetermined test pattern (or test luminance). The controller 400 may provide the rotation control signal R_CON for controlling the rotation speed of the motor 800 (and the rotator 700) to the motor 800 such that the test pattern is located in the detection area. Thus, the moving speed of the test pattern moving on the rollable display panel 100 may be substantially the same as at least one of the rolling speed and the unrolling speed of the rollable display panel 100. Accordingly, the controller 400 may control the display panel driver 500 and the motor 800 such that the pixels in the detection region emit light in synchronization with the rolling speed of the rollable display panel 100. The controller 400 may also control the display panel driver 500 and the motor 800 such that the pixels in the detection region emit light in synchronization with the unrolling speed of the rollable display panel 100.

The controller 400 may calculate a compensation value based on the detection data BR stored in the memory 600. At the beginning of displaying an image, the controller 400 may receive the image data IDATA from an external graphic source, and generate the compensated image data CDATA of a digital type based on the compensation value. The controller 400 may provide the compensated image data CDATA to the display panel driver 500.

As described above, the flexible display device 1001 may include the optical sensor 300 detecting the luminance of each pixel P during the rolling and/or unrolling and the controller 400 controlling the detecting operation and compensating the image data IDATA, so that the compensation accuracy of the luminance variations, characteristic variations, and degradation of the pixels may be improved. In addition, the luminance detection and the compensation may be frequently performed during the rolling and/or unrolling in use, so that a flexible display device having high quality and high luminance uniformity may be consistently provided to the user in use.

Figure 6:
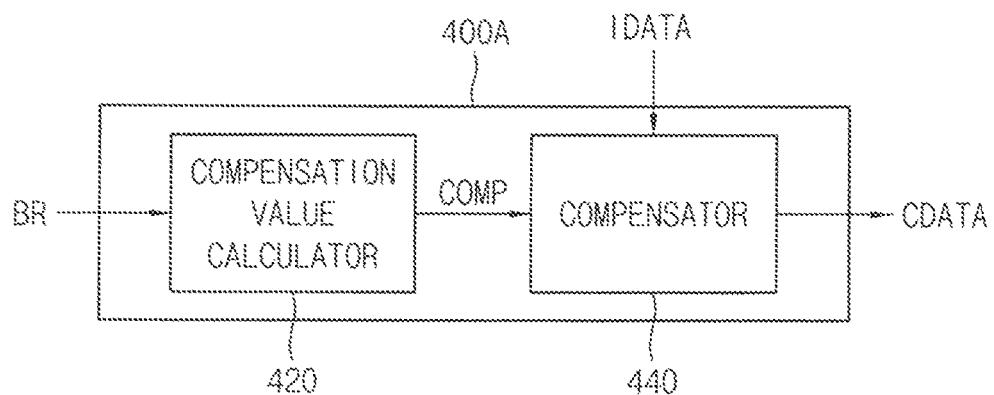
FIG. 6 is a block diagram illustrating an example of a controller included in the flexible display device of FIG. 5.

FIG. 6 is a block diagram illustrating an example of a controller included in the flexible display device of FIG. 5.

Referring to FIGS. 5 and 6, the controller 400A may include a compensation value calculator 420 and a compensator 440.

The controller 400A may control the optical sensor, the display panel driver, the memory, and the motor based on the rolling and/or unrolling of the rollable display panel.

The compensation value calculator 420 may calculate a compensation value COMP based on the detection data BR stored in the memory. The detection data BR may include luminance information of each of the pixels with respect to the same data voltage.

In one embodiment, the compensation value calculator 420 may load the detection data BR from the memory at the beginning of displaying an image (i.e., a state that the rollable display panel is pulled out and ready to display image). The compensation value calculator 420 may relatively compare the detection data BR of all of the pixels so as to calculate the compensation value COMP for compensating luminance variations and degradation. For example, the compensation value calculator 420 may calculate the luminance variations of the all pixels by comparing the detection data BR, and calculate weight for the image data IDATA of each of the pixels based on the luminance variations.

In one embodiment, the compensation value calculator 420 may load the detection data BR from the memory and calculate the compensation value COMP when the rolling or unrolling of the rollable display panel is complete. The compensation value COMP may be stored in the memory until the image display is started.

In one embodiment, the compensation value calculator 420 may compare a predetermined reference luminance and the detection data BR of each of the pixels so as to calculate the compensation value COMP for compensating the luminance variations and the degradation. For example, the compensation value calculator 420 may calculate the weight for the image data IDATA of the pixels which have detected luminance that is out of a predetermined range of the reference luminance.

The compensator 440 may generate the compensated image data CDATA for compensating the input image data IDATA based on the compensation value COMP. In one embodiment, when the rollable display panel displays an image, the compensator 440 may receive the image data IDATA from an external graphic source and receive the compensation value COMP from the compensation value calculator 420 or the memory. The compensator 440 may generate the compensated image data CDATA of the digital type by applying the compensation value COMP to each of the corresponding image data IDATA. The compensator 440 may provide the compensated image data CDATA to the display panel driver.

The luminance variations and characteristic variations of the pixels may be compensated to be uniform and the degradation of the pixels may be compensated by the compensated image data CDATA. Thus, the luminance uniformity of the flexible display device and the image quality may be improved.

Figure 7:
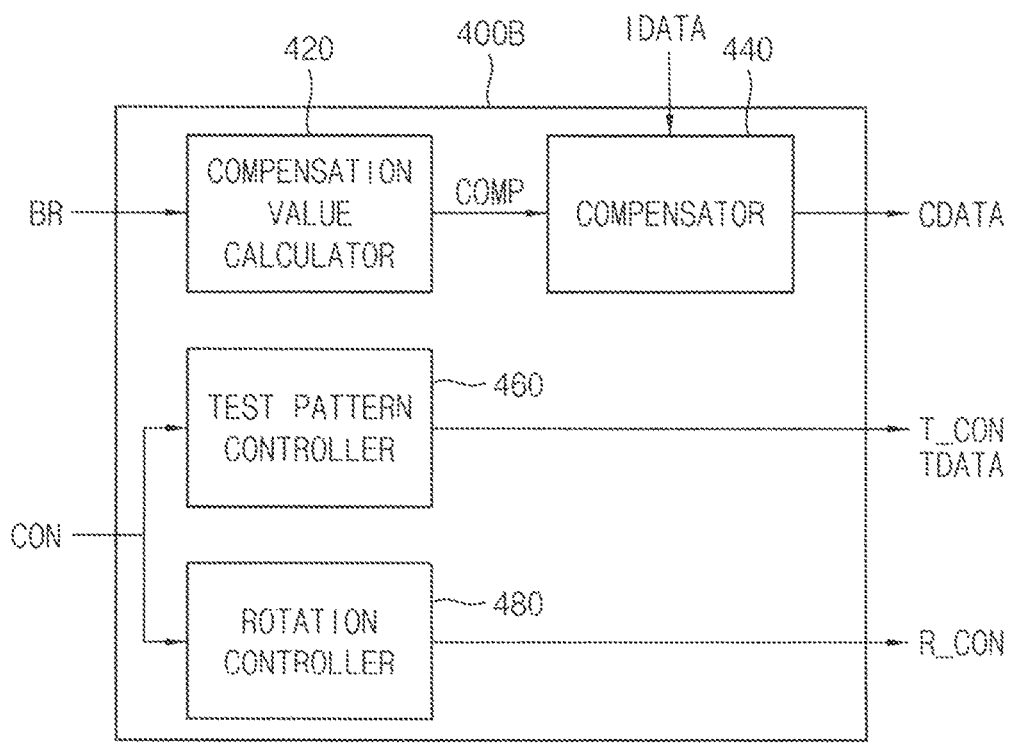
FIG. 7 is a block diagram of another example of a controller included in the flexible display device of FIG. 5.

FIG. 7 is a block diagram of another example of a controller included in the flexible display device of FIG. 5.

In FIG. 7, like reference numerals are used to designate elements of the flexible display device the same as those in FIG. 6, and detailed description of these elements may be omitted. The controller of FIG. 7 may be substantially the same as or similar to the controller of FIG. 6 except for the test pattern controller 460 and the rotation controller 480.

Referring to FIGS. 5 and 7, the controller 400B may include a compensation value calculator 420, a compensator 440, a test pattern controller 460, and a rotation controller 480.

The compensation value calculator 420 may calculate a compensation value COMP based on the detection data BR stored in the memory. The compensator 440 may generate the compensated image data CDATA for compensating the input image data IDATA based on the compensation value COMP.

The plurality of pixel lines may pass through the detection region while the rollable display panel is rolled or unrolled. The test pattern controller 460 may control the display panel driver such that the pixels (or the pixel lines) in the detection region display a predetermined test pattern. In one embodiment, the test pattern controller 460 may provide the test control signal T_CON and the test image data TDATA to the display panel driver based on a rolling/unrolling command CON. Accordingly, the pixel lines may emit light when they are in the detection region during the rolling or the unrolling. The pixels lines may stop emitting light when they get out of the detection region. In one embodiment, the test pattern may correspond to at least one line pattern of the pixel lines in the detection region at that moment. The test pattern may correspond to a capable maximum luminance of the flexible display device or a full white grayscale. However, these are examples, and shapes, sizes, and luminance of the test pattern are not limited thereto.

The rotation controller 480 may control a rotation speed of the motor such that the test pattern is located in the detection region. In one embodiment, the rotation controller 460 may provide the rotation control signal R_CON to the motor based on the rolling/unrolling command CON. The pixels (or pixel lines) corresponding to the detection region may emit light in synchronization with a rolling speed and/or an unrolling speed of the rollable display panel. In one embodiment, a moving speed of the test pattern moving on the rollable display panel may be substantially the same as at least one of the rolling speed and the unrolling speed of the rollable display panel.

Accordingly, the pixels may display the test pattern only in the detection region during the rolling and/or unrolling state. At the same time, the optical sensor may detect the accurate luminance of the test pattern. Thus, the compensation accuracy of the luminance variations, characteristic variations, and degradation of the pixels may be improved.

Figure 8:
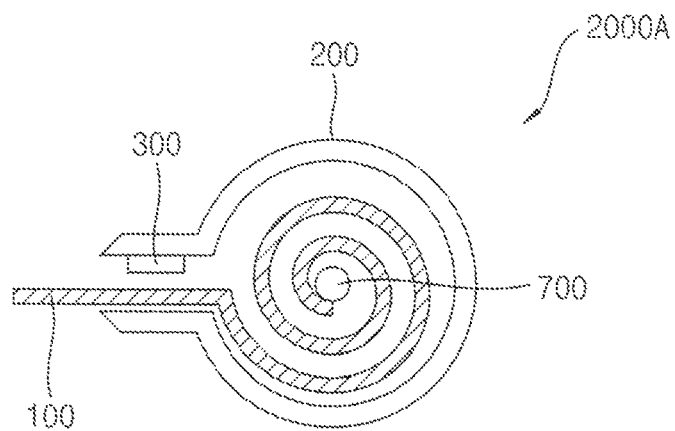
FIG. 8 is a schematic cross-sectional view of an example of the flexible display device of FIG. 1.
Figure 9:
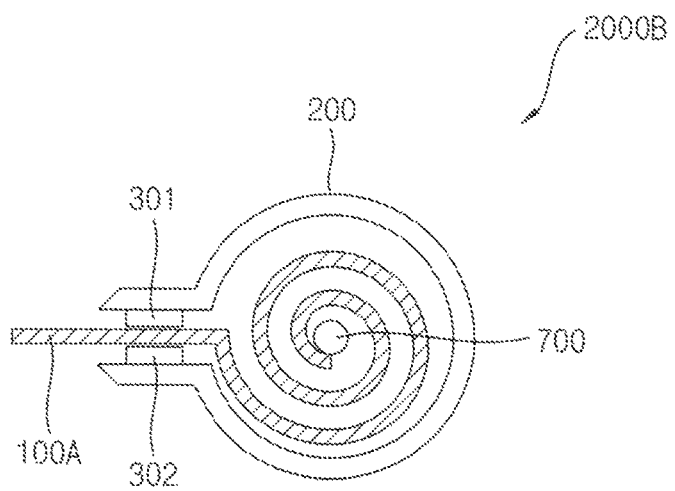
FIG. 9 is a schematic cross-sectional view of another example of the flexible display device of FIG. 1.
Figure 10:
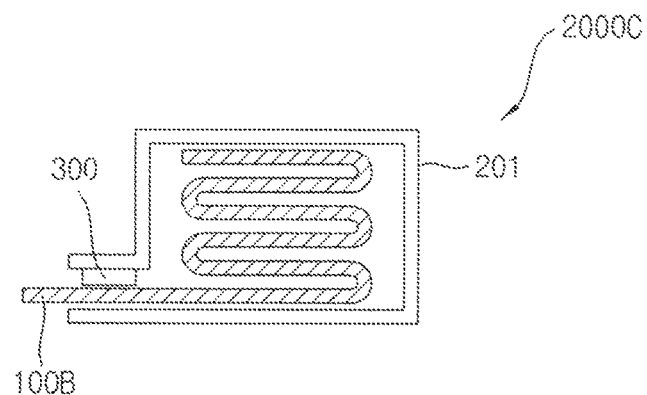
FIG. 10 is a schematic cross-sectional view of still another example of the flexible display device of FIG. 1.

FIG. 8 is a schematic cross-sectional view of an example of the flexible display device of FIG. 1. FIG. 9 is a schematic cross-sectional view of another example of the flexible display device of FIG. 1. FIG. 10 is a schematic cross-sectional view of still another example of the flexible display device of FIG. 1.

Referring to FIGS. 8 to 10, the flexible display devices 2000A, 2000B, and 2000C may include a rollable display panel 100, 100A, and 100B, respectively a housing 200 and 201 having an opening portion, and an optical sensor 300, 301, and 302, respectively. The flexible display devices 2000A, 2000B, and 2000C may further include a controller, a display panel driver, a rotator 700, and a motor as described above.

The optical sensors 300, 301, and 302 may each be a type of line optical sensor. Thus, the optical sensors 300, 301, and 302 may detect luminance of at least one pixel line (e.g., a pixel row line or a pixel column line) at a time.

As illustrated in FIG. 8, the rollable display panel 100 may be pulled out from the housing 200 and rolled into the housing 200. The optical sensor 300 may be disposed at the opening of the housing 200. The optical sensor 300 may be facing a light emitting surface of the rollable display panel 100 and detect luminance of each pixel.

As illustrated in FIG. 9, the optical sensor 301 and 302 may be facing both surfaces of the rollable display panel 100A. In this case, the rollable display panel 100A may correspond to a double-sided display panel or a transparent display panel. Thus, the optical sensor 301 and 302 may detect the luminance of each pixel at both surface of the rollable display panel 100A.

As illustrated in FIG. 10, the rollable display panel 100B may be rolled in a zigzag form. In this case, the housing may include a plurality of axis members for rolling in the zigzag form. In one embodiment, a cross section of the housing 201 may be a square shape, and the housing 201 of a rectangular cylinder type may be provided.

However, these are examples, and shapes of the housings 200 and 201, types of the rollable display panels 100, 100A, and 100B, rolling types of the rollable display panels 100, 100A, and 100B, locations of the optical sensors 300, 301, and 302, and the number of the optical sensors 300, 301, and 302, etc are not limited thereto.

Figure 11:
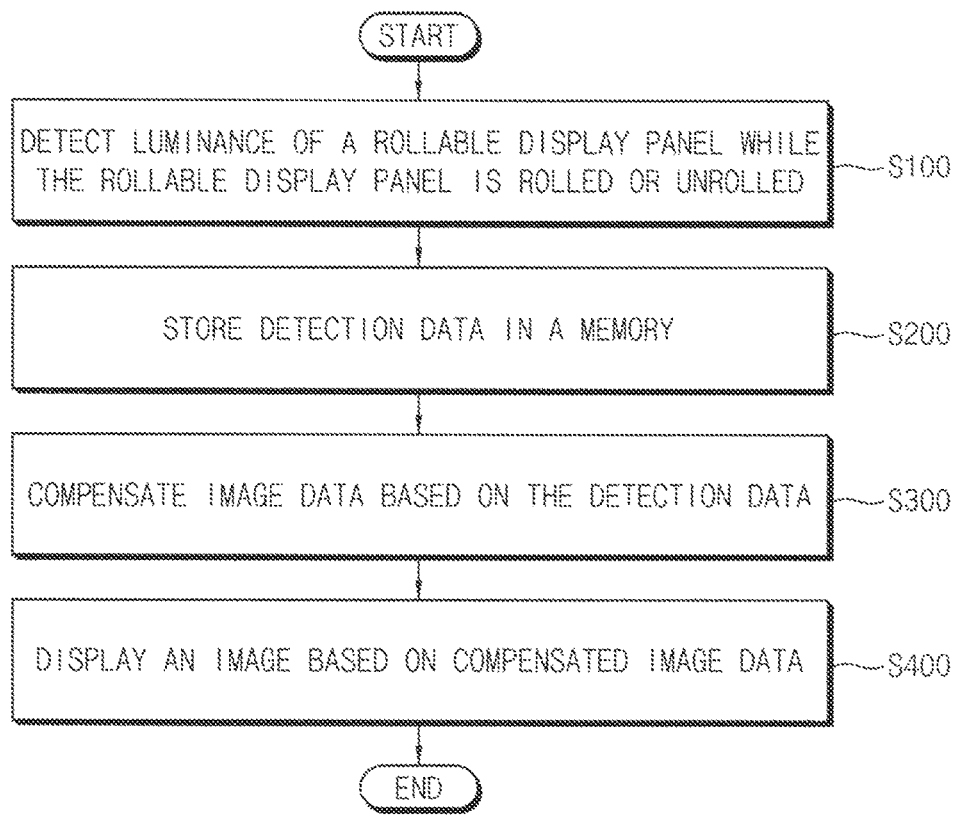
FIG. 11 is a flow chart of a method for compensating an image of a flexible display device according to example embodiments.

FIG. 11 is a flow chart of a method for compensating an image of a flexible display device according to example embodiments.

Referring to FIG. 11, the method for compensating an image of the flexible display device may include detecting luminance of a plurality of pixels located in a detection region facing an optical sensor by using the optical sensor disposed at an opening portion of a housing while a rollable display panel is rolled or unrolled S100, storing detection data generated by the optical sensor in a memory S200, compensating image data based on the detection data S300, and displaying an image based on compensated image data S400.

The luminance of the pixels may be detected by the optical sensor while the rollable display panel is rolled into or unrolled out from the housing S100. In one embodiment, the optical sensor may detect the luminance of the pixels in the detection region during the rolling and/or unrolling. In one embodiment, the pixels may emit light only in the detection region when the rollable display panel is rolled into or unrolled out of the housing.

The detection data may be stored in the memory S200. In one embodiment, the memory may store the detection data of each of all of the pixels. The detection data may include the detected luminance information, the location information, and the degradation information of each pixel. In one embodiment, the memory may further store a compensation value of each pixel generated based on the detection data.

The image data may be compensated based on the detection data S300. In one embodiment, the detection data stored in the memory may be provided to a controller of the flexible display device so that the controller may compensate the image data based on the detection data. In one embodiment, the image data may be compensated based on the compensated value stored in the memory.

Then, a compensated image may be displayed based on the compensated image data S400.

Figure 12:
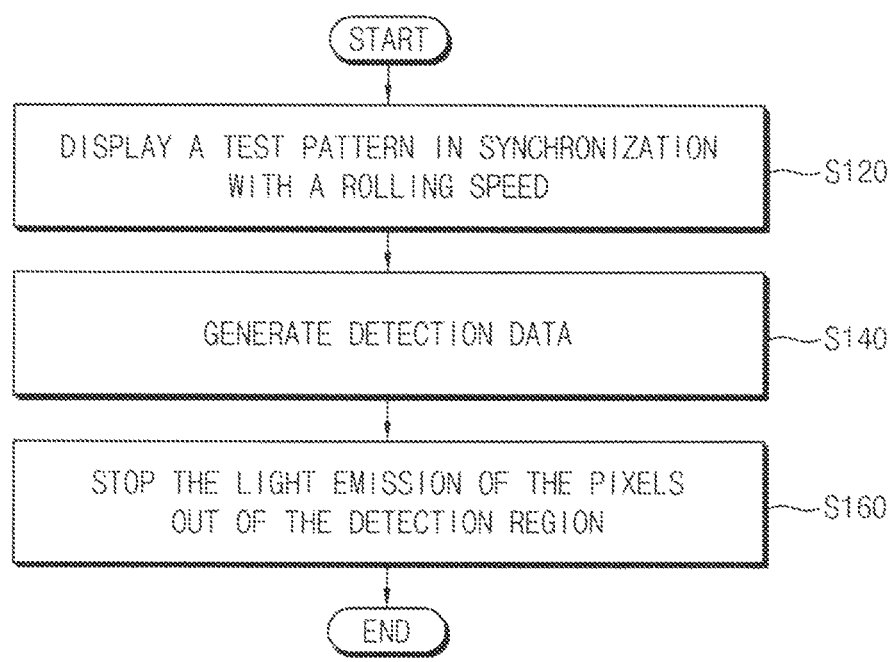
FIG. 12 is a flow chart for explaining an example of detecting luminance of a rollable display panel of the method of FIG. 11.

FIG. 12 is a flow chart for explaining an example of detecting luminance of a rollable display panel of the method of FIG. 11.

Referring to FIGS. 11 and 12, the method for detecting the luminance S100 may include displaying a predetermined test pattern by the pixels in the detection region in synchronization with a rolling speed of the rollable display panel S120, generating the detection data including luminance information of the pixels with respect to the test pattern S140, and stopping the light emission of the pixels when the pixels get out of the detection region S160.

In one embodiment, a moving speed of the test pattern moving on the rollable display panel may be substantially the same as at least one of a rolling speed and an unrolling speed of the rollable display panel.

Figure 13:
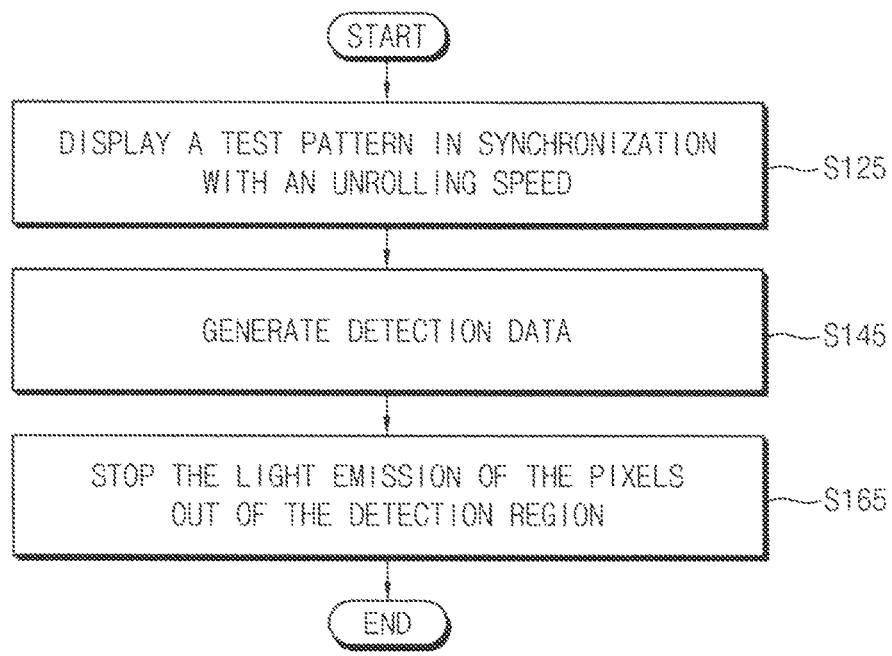
FIG. 13 is a flow chart for explaining another example of detecting luminance of a rollable display panel of the method of FIG. 11.

FIG. 13 is a flow chart for explaining another example of detecting luminance of a rollable display panel of the method of FIG. 11.

Referring to FIGS. 11 and 13, the method for detecting the luminance S100 may include displaying a predetermined test pattern by the pixels in the detection region in synchronization with an unrolling speed of the rollable display panel S125, generating the detection data including luminance information of the pixels with respect to the test pattern S145, and stopping the light emission of the pixels when the pixels move out of the detection region S165. In one embodiment, a moving speed of the test pattern moving on the rollable display panel may be substantially the same as at least one of a rolling speed and an unrolling speed of the rollable display panel.

Since the operations for detecting the luminance and generating the detection data are described above in reference to FIGS. 1 to 7, duplicate descriptions will not be repeated.

Figure 14:
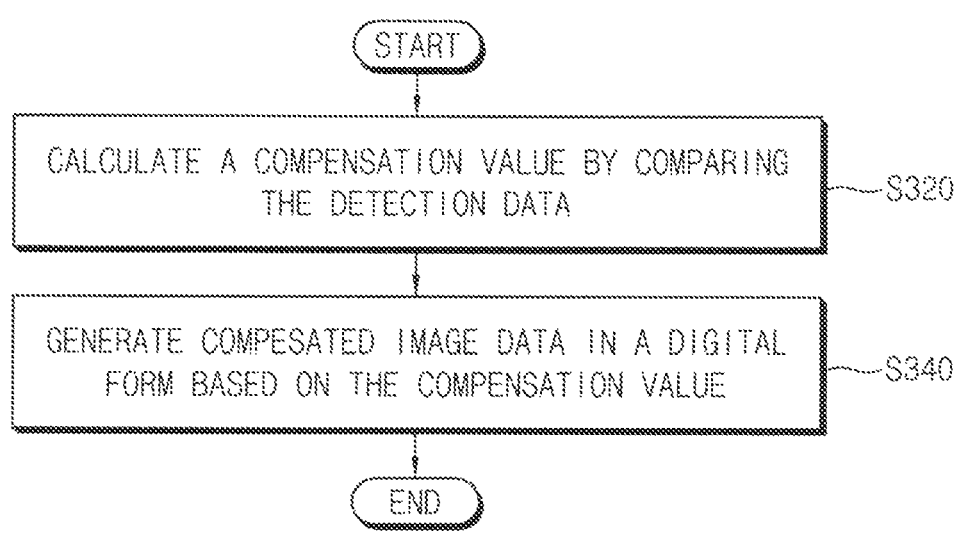
FIG. 14 is a flow chart for explaining an example of compensating image data of the method of FIG. 11.

FIG. 14 is a flow chart for explaining an example of compensating image data of the method of FIG. 11.

Referring to FIGS. 11 to 14, the method for compensating the image data S300 may include calculating a compensation value for compensating luminance variations and degradation by comparing the detection data of all of the pixels S320, and generating the compensated image data of a digital type based on the compensation value S340.

Since the operations for compensating the image data are described above in reference to FIGS. 1 to 7, duplicate descriptions will not be repeated.

As described above, the method for compensating the image of the flexible display device may directly detect the luminance of the pixels using the optical sensor during the rolling and/or unrolling so that the compensation accuracy of the luminance variations, characteristic variations, and degradation of the pixels may be improved. In addition, the luminance detection and the compensation may be frequently performed during the rolling and/or unrolling in use, so that the flexible display device having high quality and high luminance uniformity may be consistently provided to a user in use.

The present embodiments may be applied to any flexible display device and any system including the flexible display device. For example, the present embodiments may be applied to a television, a computer monitor, a laptop, a digital camera, a cellular phone, a smart phone, a smart pad, a personal digital assistant (PDA), a portable multimedia player (PMP), a MP3 player, a navigation system, a game console, a video phone, etc.

The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. A flexible display device comprising:
   a rollable display panel;
   a housing accommodating the rollable display panel in a rolled state and including an opening portion through which the rollable display panel is pulled out;
   an optical sensor disposed at the opening portion and configured to detect a luminance of the rollable display panel while the rollable display panel is rolled or unrolled;
   a controller configured to compensate image data based on detection data generated by the optical sensor; and
   a display panel driver configured to control a display of the rollable display panel,
   wherein the luminance of the rollable display panel is a luminance of a plurality of pixels located in a detection region facing the optical sensor while the rollable display panel is rolled into or unrolled out from the housing, the optical sensor is configured to detect the luminance of the plurality of pixels, and
   wherein the controller comprises:
   a compensation value calculator configured to calculate a compensation value based on the detection data including luminance information of the pixels detected by the optical sensor; and
   a compensator configured to compensate the image data based on the compensation value.

2. The flexible display device of claim 1, wherein the controller is configured to control the display panel driver such that the pixels of the plurality of pixels located in the detection region emits light in synchronization with a rolling speed of the rollable display panel.

3. The flexible display device of claim 1, wherein the controller is configured to control the display panel driver so that the pixels located in the detection region emit light in synchronization with an unrolling speed of the rollable display panel.

4. The flexible display device of claim 1, further comprising:
   a memory configured to store the detection data;
   a rotator on which the rollable display panel is rolled; and
   a motor coupled to the rotator and configured to rotate the rotator to control the rolled state of the rollable display panel.

5. The flexible display device of claim 4, wherein the compensation value calculator is configured to relatively compare the detection data of all of the pixels so as to calculate the compensation value for compensating luminance difference and degradation.

6. The flexible display device of claim 4, wherein the compensation value calculator is configured to compare a predetermined reference luminance and the detection data so as to calculate the compensation value for compensating luminance difference and degradation.

7. The flexible display device of claim 4, wherein the controller further comprises:
   a test pattern controller configured to control the display panel driver such that the pixels located in the detection region display a predetermined test pattern; and
   a rotation controller configured to control a rotation speed of the motor such that the test pattern is located in the detection region.

8. The flexible display device of claim 7, wherein a moving speed of the test pattern moving on the rollable display panel is substantially the same as at least one of a rolling speed and an unrolling speed of the rollable display panel.

9. The flexible display device of claim 7, wherein the pixels stop emitting light when the pixels get out of the detection region.

10. The flexible display device of claim 1, wherein the optical sensor is facing a light emitting surface of the rollable display panel.

11. The flexible display device of claim 10, wherein the optical sensor corresponds to at least one line optical sensor.

12. The flexible display device of claim 11, wherein the pixels facing the at least one line optical sensor corresponds to at least one pixel line.

13. The flexible display device of claim 1, wherein the rolled state of the rollable display panel is a zigzag form.

* * * * *